Jan. 7, 1930.  A. E. WIENHOLZ ET AL  1,743,057
STONE SAWING MACHINE
Filed March 23, 1928
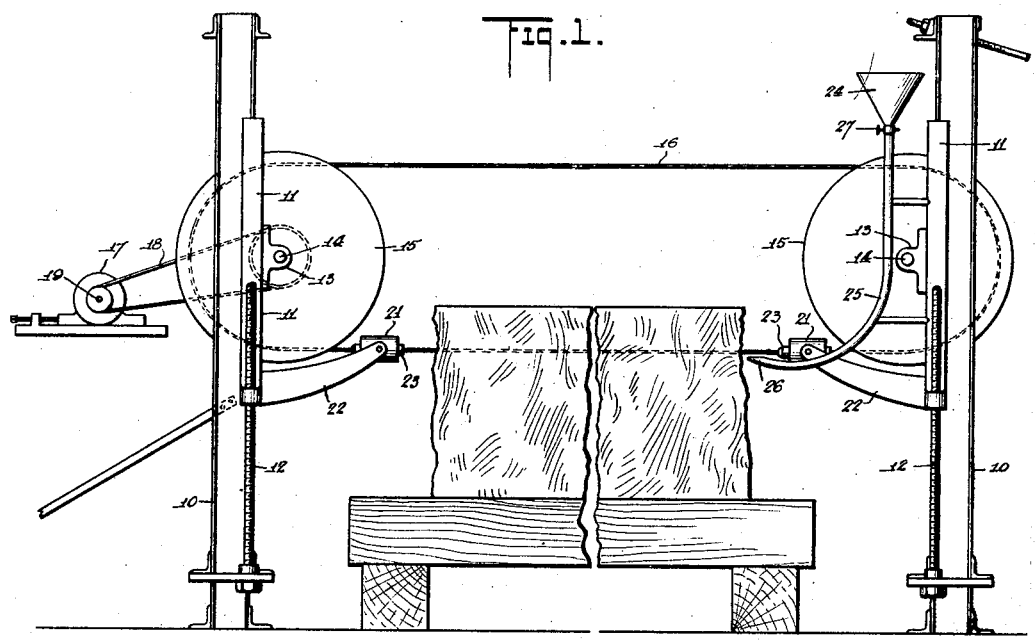
Fig.1.
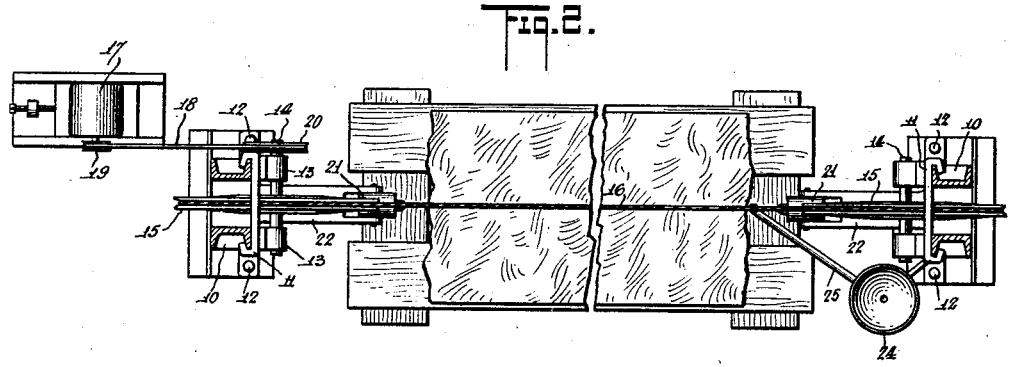
Fig.2.
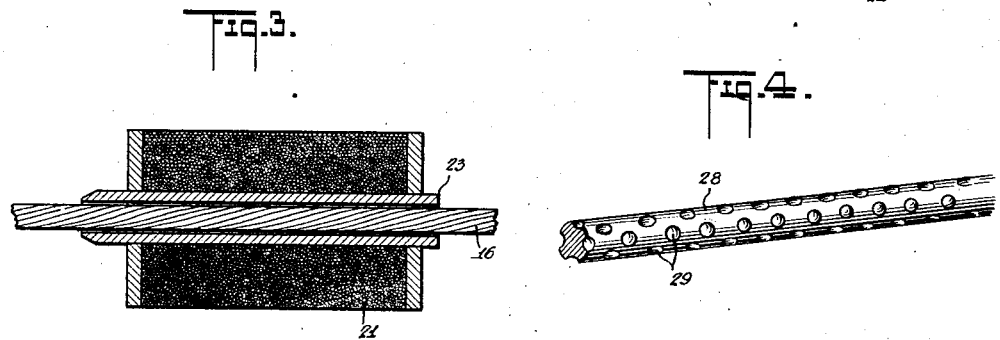
Fig.3.
Fig.4.
WITNESSES
INVENTOR
Albert E. Wienholz
Frederick Siefke
BY
ATTORNEY Patented Jan. 7, 1930

1,743,057

UNITED STATES PATENT OFFICE

ALBERT E. WIENHOLZ, OF ASTORIA, AND FREDERICK SIEFKE, OF NEW YORK, N. Y.

STONE-SAWING MACHINE

Application filed March 23, 1928. Serial No. 264,016.

This invention relates to an improvement in a stone sawing machine.

The chief object of the present invention is to provide an improvement in a machine of the indicated character for the purpose of obtaining greater efficiency, which will cut at a comparatively increased speed, and which will reduce costs in carrying out sawing or cutting operations.

Another object of the invention, by which the above mentioned advantages are attained, is the provision in a machine of the indicated character, of a cable or wire saw permanently magnetized, or capable of being magnetized, so as to attract or pick up, and to hold suitable magnetizable abrasive material, such as steel shot or metal filings fed to it, to augment the cutting or sawing action of the saw.

The nature of the invention and its distinguishing features and advantages will appear when the following specification is read in connection with the accompanying drawing, in which—

Figure 1 is a side elevation of one type of machine embodying the features of the present invention.

Fig. 2 is a plan view.

Fig. 3 is a detail sectional view through one of the electromagnetic coils and a portion of the cable saw passed through the core.

Fig. 4 is a view illustrating a portion of a modified form of saw element.

The present invention may be put into practice in conjunction with types of machines other than the one illustrated, which is shown by way of example only, and some of the details not necessary for a full understanding of the invention, have been omitted, since they form no part of the invention.

In accordance with the invention use is made of a saw or cutting element in the form of a cable consisting of twisted strands, or other closely similar construction. It has been found that a saw of this type is of great efficiency because of the fact that it is more flexible and suitable to the problem than a blade type of saw. The cable saw will be made of magnetizable material, and may be permanently magnetized, or may be driven in the presence of suitable means which produces a magnetic field through which the saw will pass. The purpose of magnetizing the saw is to attract and to hold suitable magnetizable abrasive material to augment the cutting action of the saw.

Referring now more particularly to the drawings it will be apparent that the machine illustrated includes vertical standards 10 which are properly anchored or secured. Each standard has arranged for up and down movement thereon a traveler 11 which may be held in any desired adjusted position by suitable means, which, in the present instance includes screws 12 operatively mounted and connected with the traveler 11, and which may be turned in any suitable manner. The traveler 11 is provided with bearings 13 in which the opposite ends of an arbor 14 of a grooved wheel 15 are journaled. The cable 16 constituting the saw passes around the wheels 15 to be driven thereby. This is accomplished by applying power to the arbor 14 of one of the wheels 15 by any suitable power means such as an electric motor 17 and the intervention of a driving belt 18 which encircles pulleys 19 and 20 respectively on the shaft of the motor and the arbor 14. The cable 16 consists of twisted metal strands in order to itself be effectual for setting up a cutting or sawing action, and to more readily hold abrasive material, such as steel shot or metal filings fed to it. The cable 16 is capable of being magnetized, and this is accomplished by providing an electromagnetic coil 21 which is so positioned that when energized will magnetize the cable 16. In the present instance two magnetic coils 21 are shown, there being one carried by an arm 22 on each of the travelers 11. On lead of the cable 16 passes through the core 23 of each of the magnetic coils 21 as illustrated clearly in Fig. 3. It is to be understood that each coil 21 will be connected in an electric circuit having a suitable source of electrical energy and a control switch for opening and closing the circuit.

In order to feed magnetizable abrasive material such as steel shot or other small metal particles, so as to be attracted and to be held by the cable 16 to augment the cutting action of the wire there is provided means consisting of a funnel or hopper 24 having connected therewith a downwardly extending tube 25 whose lower end is curved, and which has its outlet end 26 positioned below and in close proximity to the lower lead of the cable 16. The said means for feeding the abrasive material is connected in any suitable manner with one of the travelers 11, and is designed to feed the abrasive material in accordance with the speed of travel of the cable 16 to insure proper attraction of the abrasive material by the cable 16. A suitable controlling device 27 may be provided in the tube 25 for controlling the movement of the abrasive material. The arrangement is such that the abrasive material will be attracted by the cable 16 to immediately enter the kerf in the stone being sawed or cut. The cable 16 constituting the saw being flexible is therefore of greater efficiency than a blade type of saw, and the efficiency of the cable will be greatly increased by being magnetized so as to attract and to hold abrasive material which will augment the cutting or sawing action of the cable. It will therefore be understood that cutting operations may be carried out at a comparatively increased speed which will result in reduction of costs.

If desired the saw instead of being in the form of a cable consisting of twisted metal strands may be made of single magnetizable metal element consisting of a single strand or wire 28, having small depressions or recesses 29 therein, as shown in Fig. 4. The recesses or depressions 29 serve to hold the abrasive particles or steel shot as they are carried through the kerf in the stone.

It is to be understood that the wire constituting the saw may be permanently magnetized so as to obviate the provision of the magnetic coil as parts of the machine.

We claim:

1. In a sawing machine, a cable saw mounted for movement with respect to the material to be cut, a magnetic circuit including a magnetic coil, said saw being made of magnetizable material, said magnetic coil being so positioned as to magnetize the saw, and means for feeding magnetizable abrasive material so as to be attracted and to be held by said saw to augment the cutting action of the saw.

2. In a machine of the class described, a saw in the form of a wire mounted for movement to cut material, said wire being made of magnetizable material, a magnetic circuit including a magnetic coil, said wire being passed through said magnetic coil to be magnetized thereby, and means for feeding magnetizable abrasive material so as to be attracted and to be held by said wire to augment the cutting action of the wire.

3. In a machine of the class described, rotors one of which is power driven, a saw in the form of an endless wire passed around said rotors to be driven thereby to cut stone or like material, said wire having an indented cutting surface, said wire being made of magnetizable material, a magnetic circuit including a magnetic coil, one lead of said wire being passed through the core of said magnetic coil to be magnetized thereby, and means for feeding magnetizable abrasive particles so as to be attracted, and to be held by said wire and thus be carried into the kerf of the stone or like material being cut to augment the cutting action of the wire.

4. In a sawing machine, the combination of a cable saw mounted for movement to cut material, said cable saw being made of magnetizable material, magnetizing means in close proximity to the saw to magnetize the saw, and means for feeding magnetizable abrasize material to a point spaced from the magnetizing means, so as to be attracted and be held by the saw, to augment the cutting action of the saw.

5. In a sawing machine, the combination of a cable saw mounted for movement to cut material, said saw being made of magnetizable material, a magnetic circuit including magnetic elements, one lead of the saw being passed through said magnetic elements to be magnetized thereby, and means for feeding magnetizable abrasive material so as to be attracted and to be held by said saw to augment the cutting action of the saw.

6. In a sawing machine, the combination of a cable saw mounted for movement to cut material, said saw being made of magnetizable material, a magnetic circuit including magnetic elements, one lead of the saw being passed through said magnetic elements to be magnetized thereby, and means for feeding magnetizable abrasive material to a point in close proximity to one of said magnetic elements, so as to be attracted and to be held by said saw to augment the cutting action of the saw.

Signed at New York, in the county of New York and State of New York, this 22nd day of March, 1928.

ALBERT E. WIENHOLZ.
FREDERICK SIEFKE.